United States Patent
Langston et al.

(10) Patent No.: US 11,981,377 B1
(45) Date of Patent: May 14, 2024

(54) TRACK DRIVE WITH SPRING-BIASED FEET

(71) Applicant: United States of America as represented by the Secretary of the Navy, Arlington, VA (US)

(72) Inventors: Tye Langston, Lynn Haven, FL (US); Dane Maglich, Panama City Beach, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 508 days.

(21) Appl. No.: 17/471,398

(22) Filed: Sep. 10, 2021

(51) Int. Cl.
*B62D 55/265* (2006.01)
*B62D 55/06* (2006.01)

(52) U.S. Cl.
CPC ........... *B62D 55/265* (2013.01); *B62D 55/06* (2013.01)

(58) Field of Classification Search
CPC ............................ B62D 55/215; B62D 55/265
See application file for complete search history.

(56) References Cited

U.S. PATENT DOCUMENTS

| | | | | |
|---|---|---|---|---|
| 4,611,860 A * | 9/1986 | Wohlford | ............. | B62D 55/215 305/43 |
| 4,645,274 A * | 2/1987 | Wohlford | ............. | B62D 55/215 305/43 |
| 5,894,901 A * | 4/1999 | Awamura | ............. | B62D 55/265 180/6.7 |
| 6,186,604 B1 * | 2/2001 | Fikse | ................... | B62D 55/253 305/180 |
| 8,528,992 B2 * | 9/2013 | Muller | ................. | B62D 55/213 305/165 |
| 9,051,009 B2 * | 6/2015 | Prohaska | ............... | B62D 55/20 |
| 10,472,007 B2 * | 11/2019 | Lee | ........................ | B62D 55/30 |

* cited by examiner

*Primary Examiner* — Kevin Hurley
*Assistant Examiner* — Hosam Shabara
(74) *Attorney, Agent, or Firm* — James T. Shepherd

(57) ABSTRACT

An endless track drive that can be coupled to a vehicle includes a plurality of track feet wherein each track foot is adapted to periodically contact a surface on which the vehicle is to travel as the endless track drive is rotated. At least one spring is coupled to each track foot. The spring(s) apply a biasing force to the track foot that positions the track foot in a neutral position relative to the endless track drive when the track foot is not in contact with the surface. The biasing force is less than a frictional force experienced by the track foot when the track foot is in contact with the surface.

18 Claims, 3 Drawing Sheets

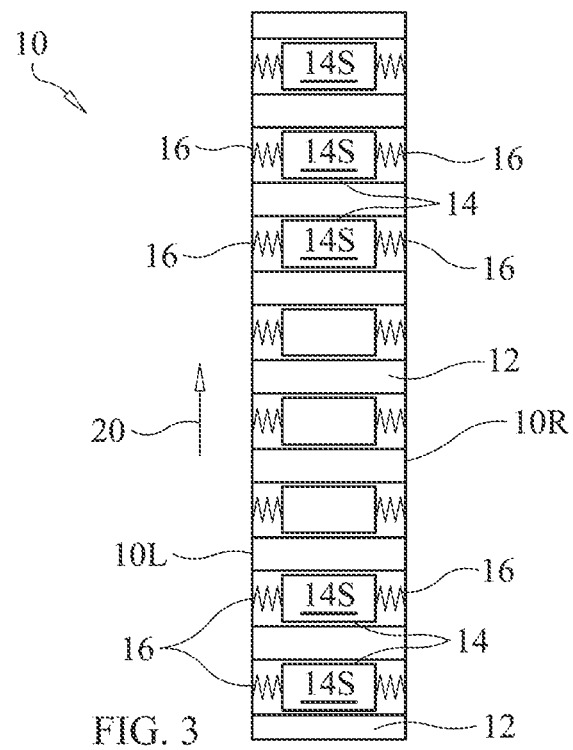
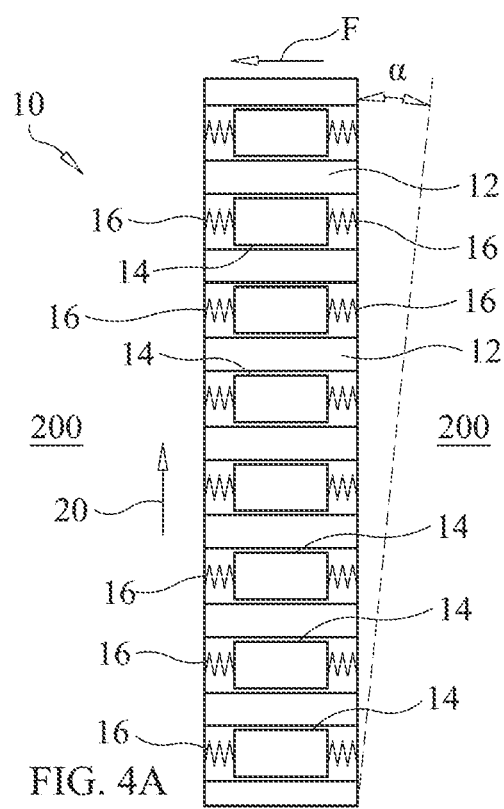 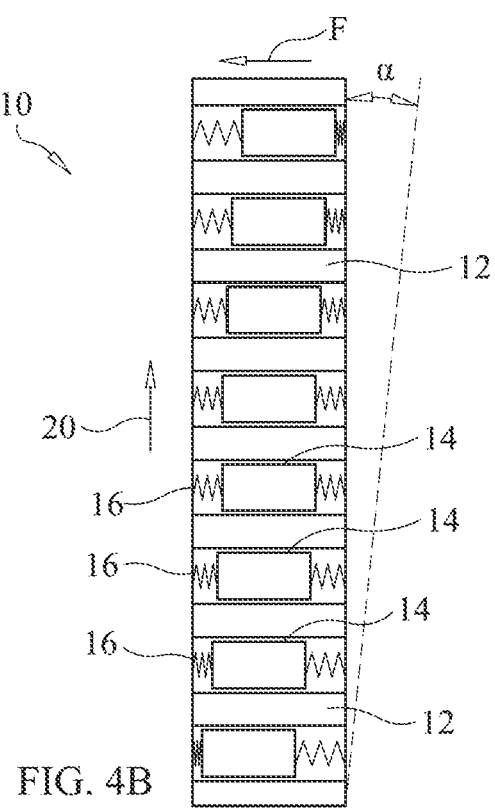
FIG. 3
FIG. 4A
FIG. 4B

TRACK DRIVE WITH SPRING-BIASED FEET

ORIGIN OF THE INVENTION

The invention described herein may be manufactured and used by or for the Government of the United States of America for Governmental purposes without payment of any royalties.

FIELD OF THE INVENTION

The invention relates generally to endless track drives, and more particularly to an endless track drive whose feet are spring-biased to support a no-skid turning operation of a track drive vehicle equipped with two of the track drives.

BACKGROUND OF THE INVENTION

Vehicles that operate on two track drives (e.g., tanks, construction equipment, crawlers, etc.) typically turn by driving one track drive faster than the other to achieve what is known as differential steering or "skid-steer" turning. As the name suggests, this type of turning results in the track drives sliding (or skidding) across the surface they are on, which is usually not desired. Skid-steer turning damages the surface the track drives are operating on and/or the track drives themselves as the fixed orientation track drives drag on the surface. For example, a skid-steer loader will significantly tear up a lawn or dirt surface during a turning operation. When a track drive vehicle operates on a hard surface like pavement or concrete, the sliding action quickly wears away the track material. In cases where there is high friction between the track drives and the operating surface, skid-steer turning requires significant energy and puts additional stress on a track drive's surface-contacting feet, endless belt, axles, sprockets and motor.

In addition to the above-described drawbacks associated with skid-steer turning, using a magnetic track drive vehicle on a vertical or overhanging surface presents unique problems. For example, developers of track drive-based magnetic crawlers know that allowing a track drive to slip or skid during turning is contrary to the need to maximize the holding force on the surface and yet not have to overcome that force in order to turn.

SUMMARY OF THE INVENTION

Accordingly, an object of the present invention is to provide a track drive and track drive system that avoids the problems associated with track drive systems and vehicles that rely on skid steering.

Another object of the present invention is to provide a track drive vehicle that reduces damage to surfaces on which the track drive vehicle must traverse.

Still another object of the present invention is to provide a track drive vehicle for use on vertical surfaces.

Other objects and advantages of the present invention will become more obvious hereinafter in the specification and drawings.

In accordance with the present invention, a track drive is provided for use in a track drive system and track drive vehicle using two of the track drives. The track drive is an endless track drive adapted to be coupled to a vehicle. The endless track drive includes a plurality of track feet wherein each track foot is adapted to periodically contact a surface on which the vehicle is to travel as the endless track drive is rotated. At least one spring is coupled to each track foot. The spring(s) apply a biasing force to the track foot that positions the track foot in a neutral position relative to the endless track drive when the track foot is not in contact with the surface. The biasing force is less than a frictional force experienced by the track foot when the track foot is in contact with the surface.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 3 is a schematic plan view of a track drive with its track feet biased to a neutral position in accordance with an embodiment of the present invention;

FIG. 4A is schematic view of the top or non-surface engaging portion of the track drive shown in FIG. 3 when the track drive is subjected to a side force induced during a turning operation;

FIG. 4B is a schematic view of the bottom or surface engaging portion of the track drive shown in FIG. 3 when the track drive is subjected to the side force induced during the turning operation.

DETAILED DESCRIPTION OF THE INVENTION

Figure 1:
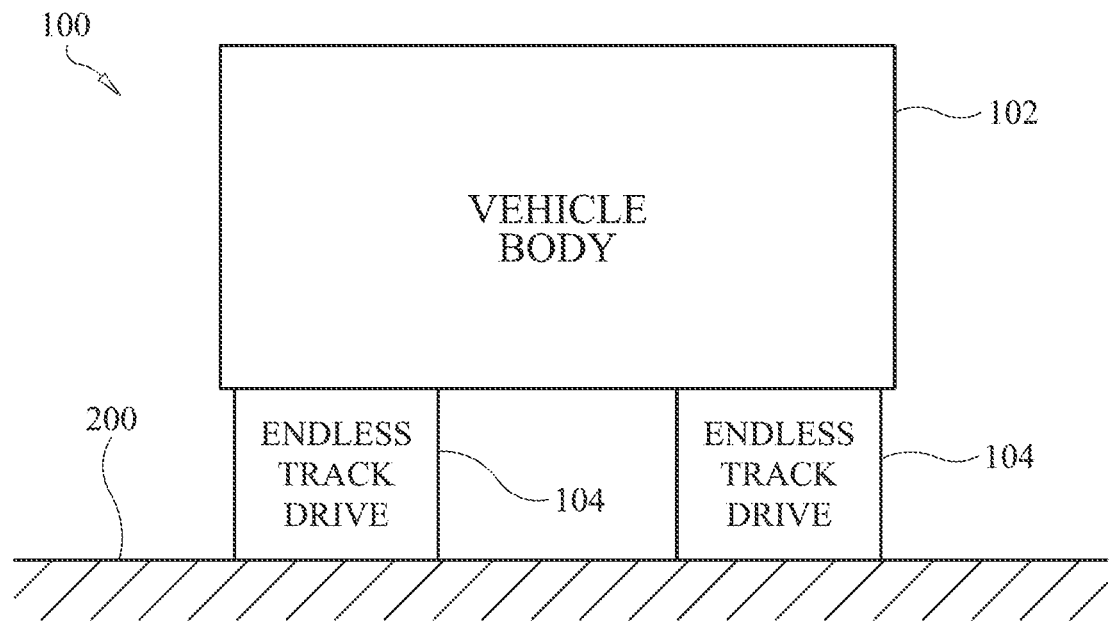
FIG. 1 is a schematic view of a conventional track drive vehicle having two track drives coupled to a vehicle body.

Referring now to the drawings, a conventional track drive vehicle is illustrated schematically in FIG. 1 and is referenced generally by numeral 100. As is well-understood in the art, track drive vehicle 100 includes a vehicle body 102 and two spaced-apart endless track drives 104 coupled to vehicle body 102. Typically, track drives 104 are parallel to one another. As used herein, the term "vehicle" includes manned and unmanned vehicles, robots, surface-traversing equipment, etc.

Figure 2:
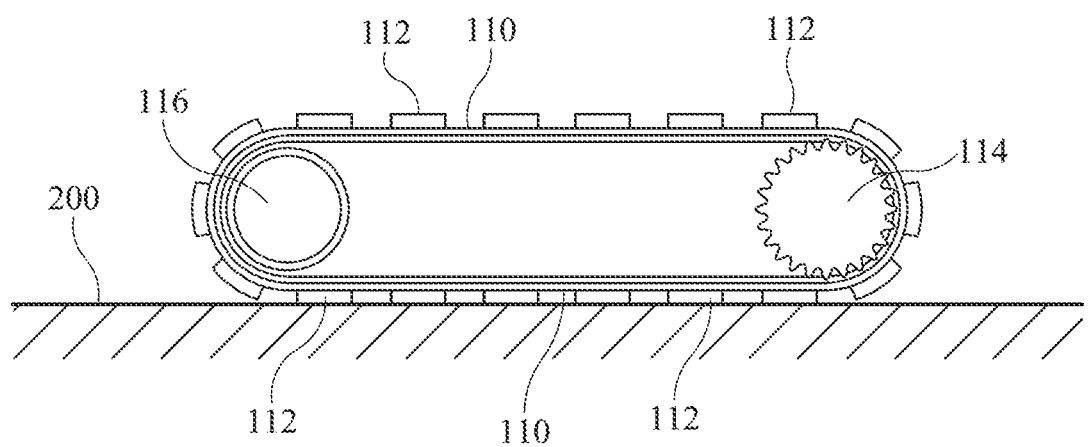
FIG. 2 is an isolated side schematic view of a conventional track drive on an operating surface.

As shown in FIG. 2, each conventional endless track drive 104 includes an endless belt 110 having a plurality of surface-contacting feet 112 fixedly coupled thereto. Endless belt 110 is driven to rotation by, for example, a drive sprocket 114 coupled to a motor drive (not shown). One or more free wheels 116 are provided to keep endless belt 110 properly tensioned and to support rotation of endless belt 110 as drive sprocket 114 is rotated as is well-known in the art.

Briefly, as track drive vehicle 100 is driven on an operating surface 200 (e.g., horizontal surface, sloped surface, vertical surface), a portion of feet 112 are in contact with surface 200 and a remainder of feet 112 are not in contact with surface 200. When track drive vehicle 100 is to be turned on surface 200, one of endless track drives 104 shown in FIG. 1 is rotated at a faster speed while the other is rotated at a slower speed thereby causing vehicle 100 to essentially slide or skid through an arc. More specifically, side forces are applied to portions of the rotating endless track drives causing the drives to slide or skid on surface 200. As a result, the feet 112 of the skidding portions of the track drives that are in contact with surface 200 are dragged across the surface. The sliding/skidding feet subject the operating surface to damage, while the track drives and their various parts are subjected to substantial stress.

The present invention reduces or eliminates the side slide/skid associated with the turning of track drive vehicles. The novelty of the present invention will be explained herein for a single track drive. However, it is to be understood that a typical track drive vehicle would have two of the present invention's track drives coupled thereto, each of which will be configured with the present invention's novel features.

Referring now to FIG. 3, a plan schematic view of a single track drive in accordance with an embodiment of the present invention is shown and is referenced generally by numeral 10. As will be explained further below, two of track drive 10 will typically be used to construct a track drive system that can be coupled to a vehicle body to thereby construct a track drive vehicle. Since both such track drives would incorporate the present invention's novel features, it is sufficient to describe those features for a single track drive. Although not shown, it is to be understood that drive mechanisms would be coupled to track drive 10 in order to drive it into rotation as would be well understood in the art.

Track drive 10 is an endless track drive that includes an endless belt 12 having a plurality of surface-engaging feet 14 spaced apart along belt 12 and coupled to belt 12. As belt 12 is rotated in a direction 20, a portion of feet 14 engage an operating surface 200, while a remainder of feet 14 do not as is well understood in the art. The surface 14S of each foot 14 that will engage an operating surface can include three-dimensional or relief features that aid in gripping the operational surface. If an operating surface is one that is magnetically attractive, each surface 14S (or all of each foot 14) could be magnetic. In other embodiments, feet 14 could be magnetic with their surface 14S also including three-dimensional surface gripping features. For other embodiments, some of feet 14 could have three-dimensional surfaces 14S, while others of feet 14 have magnetic surfaces 14S without departing from the scope of the present invention. Still other or additional grip enhancing features could include suction cups or chemical forms of adhesion without departing from the scope of the present invention.

In accordance with the present invention, each of feet 14 has one or more springs or spring-like devices 16 coupled thereto. When no force is applied to a foot 14, the foot's corresponding spring(s) 16 bias the foot to a neutral position on track drive 10. In the above-noted neutral position, a foot 14 can be moved towards either lateral side (i.e., side 10L or side 10R) of track drive 10 if the biasing force applied by spring(s) 16 is overcome. Accordingly, when track drive 10 is deployed on an operating surface with belt 12 being driven to rotation in (for example) direction 20, any of feet 14 not engaging the operating surface will be in their above-described neutral position.

Referring now simultaneously to FIGS. 4A and 4B, a turning operation for track drive 10 will be explained. For purpose of this explanation, it is assumed that a track drive system encompassing two of track drive 10 is coupled to a vehicle body (not shown). FIG. 4A illustrates the positions of feet 14 that are not engaging an operating surface 200 during the turning operation, while FIG. 4B illustrates the position of feet 14 that are engaging the operating surface (not visible in this view) during the turning operation.

As is known in the art of track drive systems/vehicles undergoing a turning operation, one of two track drives is rotated faster than the other of the two track drives. In FIGS. 4A and 4B, it is assumed that the illustrated track drive 10 is the one being rotated in direction 20 at a slower rate than its parallel/opposing track drive (not shown). When this occurs, those of feet 14 engaged on the operating surface (FIG. 4B) will experience a skidding or sliding friction force F that is perpendicular to direction 20, while those of feet 14 not engaged on the operating surface (FIG. 4A) will not experience the friction force F. Accordingly, feet 14 in FIG. 4A are maintained in their neutral position by springs 16. However, as shown in FIG. 4B, when friction force F exceeds the biasing force applied by springs 16 of a foot 14, springs 16 yield (e.g., via expansion, contraction, and/or flexion) to the larger friction force F whereby each such foot 14 does not slide or skid on the operating surface. Instead, each such foot 14 maintains its position on the operating surface as track drive 10 pivots through an angle α during the turning operation.

Figure 5:
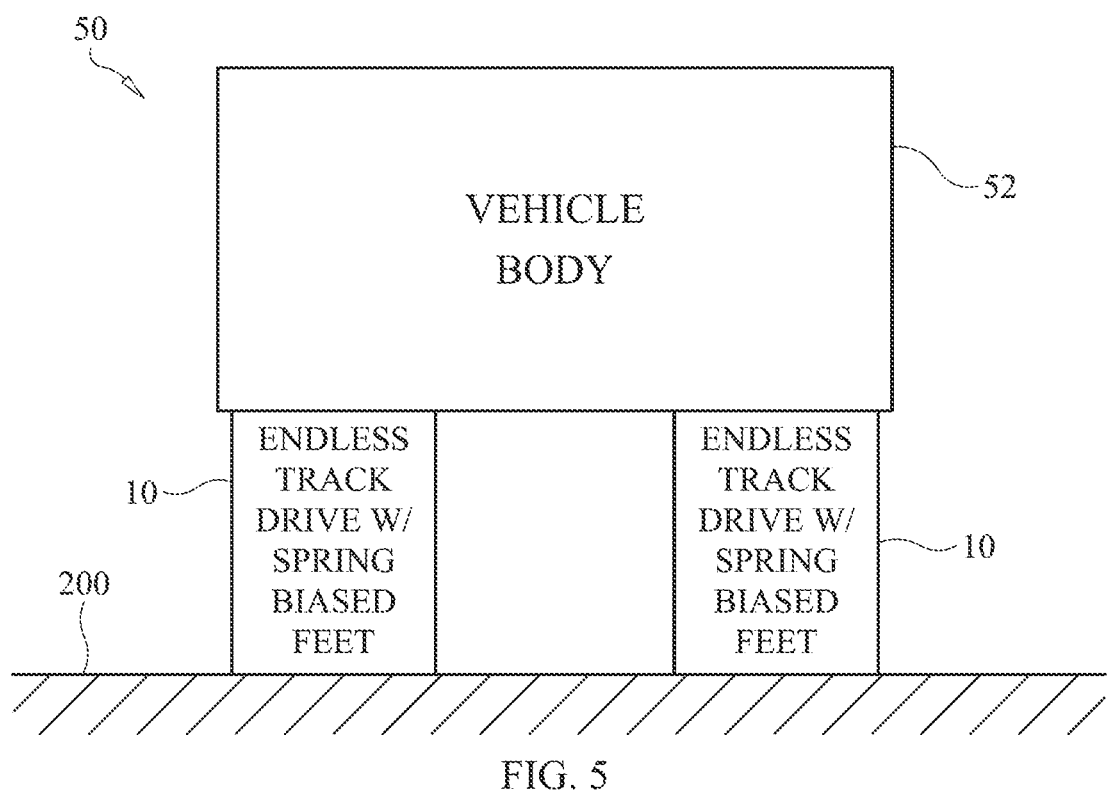
FIG. 5 is a schematic view of a track drive vehicle having two track drives with spring-biased feet in accordance with an embodiment of the present invention.

As mentioned above, two of track drives 10 will generally comprise a track drive system that can be coupled to vehicle body for a track drive vehicle. This is illustrated schematically in FIG. 5 where a track drive vehicle 50 in accordance with an embodiment of the present invention has two of track drives 10 coupled to a vehicle body 52 for deployment on a horizontal, sloped, or vertical operating surface 200.

The advantages of the present invention are numerous. Well-known track drive vehicles can be improved to provide non-skid turning operations that preserve the integrity of an operating surface. The spring-biased feet can be configured for operation on a variety of surfaces and surface orientations.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A track drive system for a vehicle, comprising:
   two endless track drives adapted to be coupled to a vehicle at opposing sides of the vehicle, each of said endless track drives including a plurality of track feet wherein each track foot from said plurality of track feet is adapted to periodically contact a surface on which the vehicle is to travel as its corresponding one of said endless track drives is rotated; and
   at least one spring coupled to each said track foot for applying a biasing force to said track foot that positions said track foot in a neutral position relative to its corresponding one of said endless track drives when said track foot is not in contact with the surface, wherein said biasing force is less than a frictional force experienced by said track foot when said track foot is in contact with the surface.

2. A track drive system as in claim 1, wherein said track foot is magnetic.

3. A track drive system as in claim 1, wherein said track foot includes a face for engaging the surface on which the vehicle is to travel, wherein said face includes three-dimensional features adapted to grip the surface.

4. A track drive system as in claim 3, wherein said track foot is magnetic.

5. A track drive system as in claim 1, wherein said at least one spring comprises two springs.

6. A track drive system as in claim 1, wherein said endless track drives have a direction of rotation associated therewith when said endless track drives are rotated, and wherein said biasing force is perpendicular to said direction of rotation.

7. A track drive vehicle, comprising:
 a vehicle body;
 two endless track drives coupled to said vehicle body at opposing sides of said vehicle body, each of said endless track drives including a plurality of track feet wherein each track foot from said plurality of track feet is adapted to periodically contact a surface on which the vehicle is to travel as its corresponding one of said endless track drives is rotated; and
 at least one spring coupled to each said track foot for applying a biasing force to said track foot that positions said track foot in a neutral position relative to its corresponding one of said endless track drives when said track foot is not in contact with the surface, wherein said biasing force is less than a frictional force experienced by said track foot when said track foot is in contact with the surface.

8. A track drive vehicle as in claim 7, wherein said track foot is magnetic.

9. A track drive vehicle as in claim 7, wherein said track foot includes a face for engaging the surface on which the vehicle is to travel, wherein said face includes three-dimensional features adapted to grip the surface.

10. A track drive vehicle as in claim 9, wherein said track foot is magnetic.

11. A track drive vehicle as in claim 7, wherein said at least one spring comprises two springs.

12. A track drive vehicle as in claim 7, wherein said endless track drives have a direction of rotation associated therewith when said endless track drives are rotated, and wherein said biasing force is perpendicular to said direction of rotation.

13. A track drive, comprising:
 an endless track drive adapted to be coupled to a vehicle, said endless track drive including a plurality of track feet wherein each track foot from said plurality of track feet is adapted to periodically contact a surface on which the vehicle is to travel as said endless track drive is rotated; and
 at least one spring coupled to each said track foot for applying a biasing force to said track foot that positions said track foot in a neutral position relative to said endless track drive when said track foot is not in contact with the surface, wherein said biasing force is less than a frictional force experienced by said track foot when said track foot is in contact with the surface.

14. A track drive as in claim 13, wherein said track foot is magnetic.

15. A track drive as in claim 13, wherein said track foot includes a face for engaging the surface on which the vehicle is to travel, wherein said face includes three-dimensional features adapted to grip the surface.

16. A track drive as in claim 15, wherein said track foot is magnetic.

17. A track drive as in claim 13, wherein said at least one spring comprises two springs.

18. A track drive as in claim 13, wherein said endless track drive has a direction of rotation associated therewith when said endless track drive is rotated, and wherein said biasing force is perpendicular to said direction of rotation.

\* \* \* \* \*